3,363,691
FILLING AND/OR PROPPING FRACTURES IN SUBTERRANEAN STRATA

Paul L. Gomory, Washington, D.C., assignor to Phillips Petroleum Company, a corporation of Delaware
No Drawing. Filed Dec. 29, 1965, Ser. No. 517,421
10 Claims. (Cl. 166—39)

This invention relates to a method for filling and/or propping a fracture around a well penetrating a permeable subterranean stratum.

In a broad aspect of the invention, it relates to filling and/or propping a fracture or cavity below an overburden by introducing into the fracture or cavity a mass of particulate material which occludes a gas or vapor which in said fracture or cavity at the conditions therein prevailing will exert a pressure sufficient to prop the fracture or cavity.

In the petroleum industry, it has become frequent practice to hydraulically fracture subterranean oil strata to create artificial fractures around a producing well to increase the productivity of the oil from the stratum or the fractures are created adjacent an injection well to enhance the injection rate of air, steam, or other fluids used in various production techniques. In some instances, fractures are created by hydraulic fracturing around both the injection and production wells to open up the intermediate stratum to heating by in situ combustion or injection of hot fluids, such as steam, or fluids which otherwise aid in the recovery of oil as by solvent action. Also, at times in other industries or in the petroleum industry, it is desirable to fill and/or to prop a cavity to prevent collapse of the upper portion thereof due to the pressure or weight of overburden thereabove. Storage cavities in which liquid or gaseous products can be stored, especially under pressure, can be propped according to the invention. Herein and in the claims reference to a fracture generally includes a cavity as well, albeit one skilled in the art will understand that there are differences between the two. In the fracture or cavity, the particulate material provides interstitial space for storage and/or movement of fluids.

Usually, the artificial fractures created around a well within an oil stratum are propped by flowing into the fracture small particulate solids which hold the fracture at least partially open after release of fracturing pressure on the fluid in the well and in the fracture. In fracturing, sufficient pressure must be applied to the fracturing fluid to separate the rock or sand and then enough pressure must be applied to hold up the overburden in order that the fracture may be in open condition. After releasing the supporting pressure, the overburden must be supported by the propping material in the fracture to maintain the fracture open. While sand is the usual propping agent for maintaining passages within the fracture leading to the well, it has sometimes been appropriate to use other, less friable, materials which resist the pressure exerted by the overburden. Among such materials are metal spheres, glass beads, and particulate plastics which exhibit high compressive strength. In deeper formations where the pressure may be in excess of 7500 p.s.i., the harder particles tend to be squeezed into and penetrate the upper and lower walls of the fracture, thus allowing the fracture to close, at least partially, and reduce the flow paths from the fracture into the well to such an extent that they are no longer practical or sufficiently useful to enhance the flow of oil into the well.

This invention is concerned with a process or technique for propping in subterranean strata which avoids the foregoing problems and results in more efficient propping for better fluid handling or flow.

Accordingly, it is an object of the invention to provide a process for more effectively propping in a subterranean stratum. Another object is to provide a propping technique which props a fracture in a permeable stratum open and holds the fracture open during subsequent operation in the production of oil from the stratum. Other aspects, objects and several advantages of the invention will become apparent to one skilled in the art upon consideration of the accompanying disclosure.

A broad aspect of the invention comprises introducing into a fracture in a permeable stratum around a well penetrating the stratum particulate material comprising principally a pre-foamed or a foamable composition. Plastic or resin or other suitable foamable material in admixture with a heat-sensitive foaming agent can be introduced into the stratum or cavity and thereafter the resin can be foamed by heat in the formation or stratum. Curing of the foamed resin or other material can be allowed to take place, and thereafter the propping pressure within the well and fracture released so as to prop the fracture with the foamed resin. The foaming takes place while the foam forming material is under fracturing or overburden-lifting pressure and, thus, the gas formed by the foaming agent is enclosed within voids in the resin and under substantial pressure equal to the surrounding pressure of the fracturing fluid which must at least hold the overburden off the lower wall of the fracture. When lifting pressure of the surrounding fluid is released, the internal pressure of the foamed resin or plastic material exerts substantial pressure against the upper and lower walls of the fracture and the great number of these small propping particles creates enough total resistance to closing of the fracture to be effective as propping agents. The resilient character of the internally-pressured foamed resin particles prevents penetration of the fracture walls to any appreciable extent so that the fracture cannot close materially from this effect.

The particles which are injected into the fracture to be propped are suitably shaped from a foamable plastic or resin admixed with a blowing or foaming agent, such as in the form of beads, ovoids, or cylinders. The diameter or average size of the particles now preferred is controlled within the range of about 0.2 to 2 mm. Cylinders can be somewhat longer than this range of sizes. The sizes to be selected can best be determined by testing under actual or simulated conditions for best results in a particular case.

Selected materials are formed into the desired shapes above ground and may be injected in this form or they may be encapsulated in a suitable resin, covered with a plastic sheath by known methods, before injection into the well and into the fracture. Any resin or plastic having a melting point substantially above ambient temperature within the stratum at fracture level may be utilized as the foamable material or as the encapsulating sheath. Plastics or resins suitable for use in the invention include polyolefins such as polyethylene and polypropylene (which may contain minor amounts of other olefin polymers or both polyethylene and polypropylene or compolymers thereof), polyamides, polycarbonates, and other foamable known polymers, such as silicone resins, polyvinyl chloride, polystyrene, polyurethane, poly(phenylene sulfide), etc. Polymers of poly(phenylene sulfide) are disclosed in the copending application of James T. Edmonds, Jr., et al., Ser. No. 327,143, filed Nov. 27, 1963. The formation of particulate foamable resins in admixture with foaming agents, including the other named resins, is disclosed in Modern Plastics Encyclopedia issue for 1965, September 1964, McGraw-Hill, Inc., New York, N.Y., pp. 299–322. The pellets or beads of foamable material including the foaming or blowing agent may be encapsulated in any conventional manner, as by sealing between two sheets of plastic by application of heat, by dipping in molten plastic and cooling the coated beads, by spraying molten plastic onto the preformed beads, etc.

Another procedure comprises forming the beads in prefoamed condition above ground and injecting the preformed foamed beads into the fracture through the well in conventional manner. The closed cellular structure of the foamed plastic contains gas under slight pressure within the closed cells which resists excessive compression when subjected to overburden pressure. Upon compression by the overburden, the internal cell pressure increases until it becomes substantially equal to the pressure exerted by the overburden. When utilizing this form of the invention, it is desirable and advantageous to encapsulate the foamable material with a shell of plastic or resin prior to the foaming step.

The plastics or resins from which the propping particles are formed are preferentially oil wetted and hydrophobic, these features contributing to the stimulation, to the flow of oil through the fracture into the well, and the minimizing of water blocks in the stratum.

The propping particles are injected into the fracture either with the hydraulic fracturing fluid at the selected level by packing off the well in conventional manner or immediately following the fracturing step in the fracturing fluid or in a different fluid. Frequently a gel type fluid is injected as the fracturing fluid under high pump pressure and after a short period in the fracture, the gel becomes more fluid and will flow out of the fracture either into the stratum or back into the well when fracturing pressure is released. It is essential to the operation that the fracture not be filled completely with the propping beads or other particulate form of material. The amount of propping material can easily be regulated to avoid filling the fracture completely. It is also feasible to admix with the foamed or foamable plastic particles, similar particles of a material which becomes fluid at downhole temperatures after a short setting period or at higher temperatures when the use of a heating fluid is resorted to in order to activate the foaming or blowing agent in the injected foamable beads. This procedure is disclosed in U.S. Patent 3,173,484 (1965). This patent discloses the use of such materials as naphthene, anthracene, petroleum asphalt, gilsonite, hard waxes, hydrogenated animal and vegetable oils, resins such as abietic acid, etc. The addition of such solid materials to the foamed or foamable particles utilized in the process of the invention spaces the permanent propping materials so that upon fluidizing (with heat or by solution) substantial voids in the fracture are left which provide passageways for oil to flow into the well or for the flow of injected gases thru the fracture deeper into the stratum.

Downhole temperatures are usually above 100° F. and run up to about 400° F. The blowing or foaming agent can be selected to operate at stratum temperature at fracture level or a foaming or blowing agent activated at a higher temperature may be utilized followed by injection of hot, noncombustion-supporting fluid to be injected into the fracture thru the well after deposition of the foamable material therein. An effective method when such a high temperature foaming agent is utilized comprises following the fracturing fluid with injection of a slug of steam, the temperature of which is regulated so as not to melt the resin or plastic in the propping material but sufficiently high to activate the foaming agent. Other hot fluids such as $CO_2$, $N_2$, liquid hydrocarbons, water, etc. may be utilized to produce the foaming or blowing desired.

A list of foaming or blowing agents is presented in the Modern Plastics Encyclopedia issue for 1965, ibid., pp. 316–317. Any of these agents may be utilized in the present invention. The compounds include azo-compounds such as azobisformamide, azobisisobutyronitrile, diazoaminobenzene, n-nitroso-compounds including N,N'-dimethyl-N,N'-dinitrosoterephthalamide, N,N'-dinitrosopentamethylenetetramine, and sulfonyl hydrazides including benzenesulfonylhydrazide, benzene-1,3-disulfonyl hydrazide, diphenylsulfon-3,3'-disulfonyl hydrazide, 4,4'-oxybis(benzenesulfonyl hydrazide). Other foaming agents such as a mixture of citric acid and sodium bicarbonate and high volatile liquids such as propane may be utilized, the invention not being limited to the specific foaming agent utilized.

In order to illustrate the invention without unnecessarily limiting the same, the following specific examples are presented.

Example I

A composition of polyvinylchloride, plasticizer, and azobis-formamide as blowing agent for pressure expansion of the PVC is made as follows:

| | Parts by weight |
|---|---|
| PVC dispersion resin | 100 |
| Di-2-ethyl-hexyl phthalate | 85 |
| Epoxidized soybean oil | 5 |
| Inhibitors-barium, cadmium or zinc | 30 |
| Azobisformamide | 20 |

The mixture is formed into beads averaging 1 mm. in diameter and a slurry of fracturing fluid containing these beads is pumped into a stratum at a depth of about 6000' thru a well extending thereinto at a pressure sufficient to fracture the stratum. The temperature at this depth is insufficient to cause foaming of the beads and the deposition of the beads in the fracture is followed by injection of steam at a temperature of 350° F. to cause foaming and expansion of the beads. The internal pressure generated by the foaming agent is about 2500 p.s.i. if held to their original volume. After releasing fluid pressure on the propped fracture, the propping material maintains the fracture open to flow thru the interstices formed by the expanded beads and fracture walls.

Example II

A composition of polystyrene containing 75 mg. of propane per gram of polystyrene plus the usual plasticizer is formed into beads having an average diameter of about 1 mm. A slurry of fracturing fluid and beads is pumped into the well and fracturing pressure is directed against the well wall at the selected level to effect fracturing, the beads entering the fracture along with the fracturing fluid. At the fracturing level of about 4900' below ground level the formation temperature is 160–170° F. which is sufficient to activate the propane as a foaming agent and foam the beads so as to exert a resilient counterpressure to cushion the fracture open when fracturing pressure is released on the well fluid.

The material selected to prop the overburden of a fracture or cavity will, of course, be such as to suit the particular nature of the void to be propped or kept open, the pressure, if any existing or likely to be built up and to be withstood and the other factors present, such as any chemistry in or to be applied to the formation either before or during the use of the well or cavity. Obviously, not all materials will be suitable for all applications and all embodiments within the scope of the claims. For best results, the material can be selected best by testing under actual or simulated conditions.

The foamable particles can be formed by mixing blowing agent into molten resin, by encapsulating blowing agent in a resinous sheath, by injecting blowing agent into a hollow sheath, by spray coating the agent with a resinous coating, or other methods of forming foamable particles as known in the art. It is also within the scope of the invention to eliminate the blowing agent and use a gasforming decomposable resin, such as polycarbonate, with or without a decomposing agent. Such particles, if desired, may be enclosed within a sheath.

One skilled in the art in possession of the several concepts of this disclosure and the appended claims will understand that the invention is primarily one of a physical nature. Accordingly, modifications of the invention will become apparent to those skilled in the art and the illustrative details disclosed are not to be construed as imposing unnecessary limitations on the invention.

I claim:

1. A process for propping an overburden above a subterranean fracture or cavity in a stratum around a well which comprises introducing particles of a material which in the fracture at the temperature of the fracture occludes a gas under a pressure sufficient to prop said fracture with said particles.

2. A process of claim 1 wherein said particles are composed of a foamable material which is foamed prior to injection into said fracture.

3. A process of claim 1 wherein said particles are composed of a foamable material which is foamed after injection into said fracture.

4. Process of claim 3 wherein said particles are foamed by the ambient heat in said fracture.

5. Process of claim 3 wherein said particles are foamed by heat from an external source.

6. Process of claim 5 wherein said heat is supplied by injecting a heated fluid.

7. Process of claim 1 wherein said gas is dispersed throughout the masses of said particles.

8. Process of claim 1 wherein said gas is enclosed in a gas-impervious shell.

9. Process of claim 1 wherein said gas is dispersed throughout the masses of said particles, and said particles are encapsulated in a gas-impervious shell.

10. Process of claim 1 wherein said material is selected from polyolefins, silicones, vinyls, polystyrene, polyurethane, poly(phenylene sulfide), polyamides, and polycarbonates.

References Cited
UNITED STATES PATENTS

| | | | |
|---|---|---|---|
| 2,761,511 | 9/1956 | Billue | 166—33 |
| 2,823,753 | 2/1958 | Henderson | 166—42.1 |
| 2,867,278 | 1/1959 | Mallory et al. | 166—33 |
| 3,137,346 | 6/1964 | McLennan | 166—33 |
| 3,181,612 | 5/1965 | West et al. | 166—42.1 |

JAMES A. LEPPINK, *Primary Examiner.*